T. NAGAYAMA.
RAT TRAP.
APPLICATION FILED AUG. 12, 1920.
1,397,384.
Patented Nov. 15, 1921.
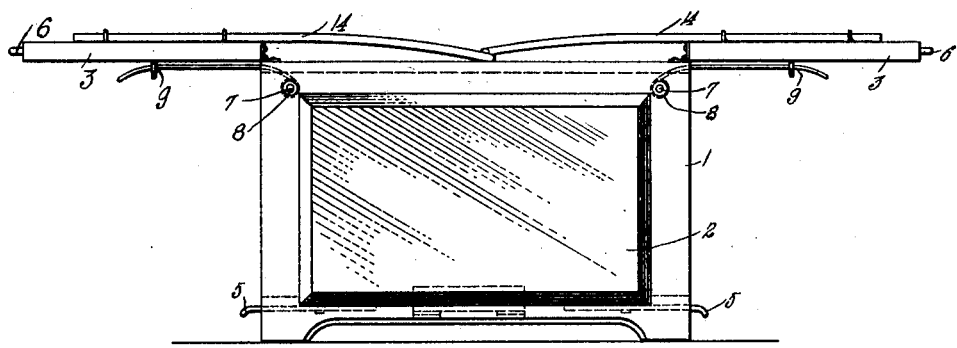
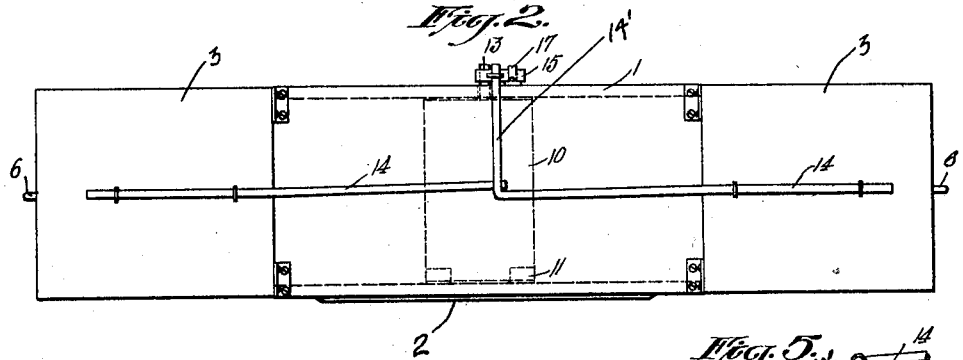
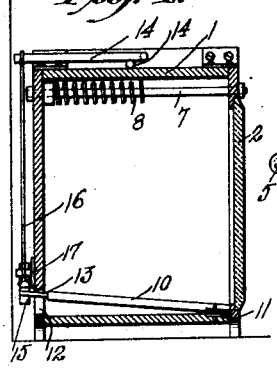
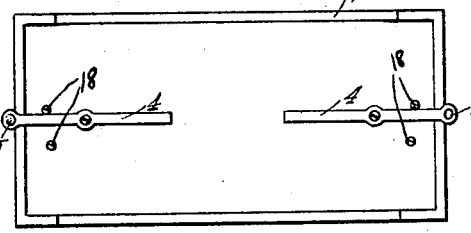
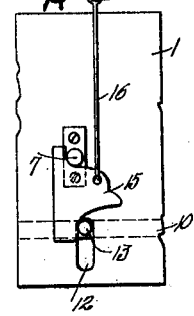
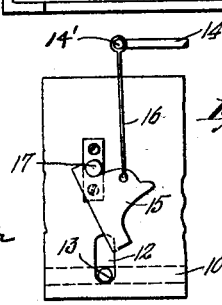
WITNESSES
INVENTOR
Tsunetaro Nagayama.
BY
ATTORNEYS

UNITED STATES PATENT OFFICE.

TSUNETARO NAGAYAMA, OF HILO, TERRITORY OF HAWAII.

RAT-TRAP.

1,397,384. Specification of Letters Patent. Patented Nov. 15, 1921.

Application filed August 12, 1920. Serial No. 402,947.

*To all whom it may concern:*

Be it known that I, TSUNETARO NAGAYAMA, a citizen of the United States, and a resident of Hilo, Territory of Hawaii, have invented a new and Improved Rat-Trap, of which the following is a full, clear, and exact description.

This invention relates to improvements in animal traps, an object of the invention being to provide an improved device of this type which is especially adapted to catch rats and other unwelcome rodents.

A further object of the invention is to provide a trap in which no bait is used and to provide improved means for enticing a rat or other animal into the trap.

A still further object is to provide a trap which will be very simple in construction yet strong, durable and practical in use.

With these and other objects in view, the invention consists in certain novel features of construction and combinations and arrangements of parts as will be more fully hereinafter described and pointed out in the claims.

In the accompanying drawings—

Figure 1 is a view in side elevation illustrating my improved trap in set position;

Fig. 2 is a top plan view of the trap in set position;

Fig. 3 is a bottom plan view;

Fig. 4 is a view in transverse section;

Fig. 5 is an enlarged fragmentary detail showing the trigger mechanism in set position;

Fig. 6 is a similar view showing the position of the trigger mechanism just after the trap has been released by the trigger.

Referring in detail to the drawings, my improved trap comprises a rectangular casing 1, preferably of metal, one side wall of the casing forming a frame for a sheet of transparent glass 2, for a purpose which will be hereinafter described. Since the casing is always placed with the transparent side wall located toward the center of the room and the other side wall located against or adjacent to the wall of the room, I shall hereinafter refer to the transparent wall as the front wall of the casing.

The two side walls of the casing extend slightly below the floor thereof so that the floor of the trap is spaced from the ground, the end walls of the casing comprising a pair of doors 3—3 hinged at their upper ends to the casing and adapted to swing outwardly. A pair of rods or arms 4 are pivotally mounted on the bottom of the casing and extend slightly beyond the end walls thereof. The rods are bent downwardly and perforated at their ends as shown at 5, to form eyes. These eyes coöperate with stubs 6 carried by the doors 3 to lock the doors in closed position. Screws 18 are provided in the bottom of the casing to limit the movement of the rods 4 so that by moving the rods against the screws, the eyes 5 will be in proper position to engage the stubs 6.

Pins 7 are mounted transversely of the casing adjacent each end thereof and springs 8 are positioned around the pins and operatively secured to the doors 3 as shown at 9, so that the doors must be opened against the torsion of the springs as will be readily understood.

A false bottom or platform 10 is located in the casing and hingedly connected to the floor thereof, as shown at 11. The rear wall of the casing is provided with a slot 12 to accommodate a trigger 13 which is secured to the platform. The trigger 13 is preferably made of bamboo or some similar light wood for a purpose which will be hereinafter set forth. Each door 3 carries a holding arm 14, one of the arms being angular, and when the arms are in the set position shown in Figs. 1 and 2, the free end of the angle arm 14 extends beyond the edge of the rear wall of the casing. A trip 15, which comprises a curved plate preferably of bamboo, is suspended from the free end of the angle arm 14 by any suitable connecting means 16. A metal stud 17 is secured to the exterior face of the rear wall of the casing above the slot 12 and slightly offset therefrom.

The operation is as follows:

To set the trap, the doors 3—3 are swung upwardly against the torsion of the springs 8 and the arms 14 are moved to the set position shown in Fig. 2. The trip 15 is moved into position under and engaging the stud 17. The platform 10 is swung on its hinges until the trigger 13 engages the trip 15 so that the trip 15 is confined between the stud 17 and the trigger 13. The rods 4 are swung into position with the eyes 5 ready to engage the stubs 6 when the trap has been sprung.

I depend upon the friction between the trigger 13 and the trip 15 to keep the platform 10 in elevated position, and for this reason they are made of bamboo. If the friction is insufficient to retain the trigger in set position, the trigger and plate may be slightly moistened to cause sufficient friction and adherence. A rat in the room will be attracted by his own shadow or image in the glass and will enter the casing from curiosity. As soon as the rat steps on the platform 10, his weight will move the platform downwardly, withdrawing the trigger 13 from engagement with the trip 15, thus releasing the trip, and consequently the arms 14. The springs 8 will slam the doors 3 into closed position, the stubs 6 and the eyes 5 automatically locking as the doors descend, and the rat will be locked in the trap.

I avoid the use of polished mirrors since it has been discovered that mirrors even at night, serve to frighten the rodents rather than to attract them, but sheet glass with a dark background formed by the wall of the casing has proved to be very practical in this connection.

While I have illustrated the preferred embodiment of my invention, it is apparent that various slight changes and alterations might be made in the general form of the parts described without departing from my invention, and hence I do not wish to limit myself to the precise details set forth but consider myself at liberty to make such slight changes and alterations as fairly fall within the spirit and scope of the appended claims.

I claim:

1. A rat trap, comprising a rectangular casing, a pair of doors hingedly connected at their upper edges to the ends of the casing and normally closing the casing, a pair of interlocking arms carried by the outer face of the doors, a lateral extension on one arm overlying the end of the other arm when the doors are swung to elevated position and extending beyond the edge of the casing, a flexible device depending from the projecting end of the extension, a trip plate carried by the flexible device, means frictionally engageable with the trip plate for holding the doors in elevated position, and means whereby the weight of an animal in the trap releases said last mentioned means.

2. A rat trap comprising a rectangular casing, a pair of doors hingedly connected at their upper edges to the ends of the casing and normally closing the ends of the casing, a tilting platform located on the floor of the casing, said casing having a vertical slot in one side wall thereof, a trigger fixed to the platform and extending through the slot, a trip plate frictionally engageable with the trigger to hold one side of the platform in elevated position, means connecting the trip plate and doors and retaining the doors in elevated position when the trip plate and trigger are in engagement, said means comprising interlocking arms carried by the outer faces of the doors, a lateral extension on one arm overlying the end of the other arm and extending over the edge of the casing when the doors are swung to elevated position, a flexible device connecting the projecting end of the extension and the trip plate and retaining the arms against the top of the casing, and means preventing a direct upward movement of the trip plate.

TSUNETARO NAGAYAMA.